US006868043B1

(12) United States Patent
Berkman

(10) Patent No.: US 6,868,043 B1
(45) Date of Patent: Mar. 15, 2005

(54) BEAM BROADENING WITH MAXIMUM POWER IN ARRAY TRANSDUCERS

(75) Inventor: Evan Frank Berkman, Newton Centre, MA (US)

(73) Assignee: BBNT Solutions LLC, Cambridge, MA (US)

(*) Notice: Subject to any disclaimer, the term of this patent is extended or adjusted under 35 U.S.C. 154(b) by 0 days.

(21) Appl. No.: 10/370,248

(22) Filed: Feb. 20, 2003

(51) Int. Cl.[7] .............................. G01S 3/80; H01Q 3/26

(52) U.S. Cl. ........................ 367/123; 367/103; 367/119; 342/371; 342/372

(58) Field of Search ................................ 342/371, 372, 342/373, 374, 375, 81, 368; 367/103, 119, 123

(56) References Cited

U.S. PATENT DOCUMENTS

| | | | | |
|---|---|---|---|---|
| 3,771,163 A | | 11/1973 | Marimaccio | 343/854 |
| 4,318,104 A | * | 3/1982 | Enein | 342/372 |
| 4,814,775 A | * | 3/1989 | Raab et al. | 342/373 |
| 5,027,125 A | * | 6/1991 | Tang | 342/368 |
| 5,028,930 A | | 7/1991 | Evans | 342/373 |
| 5,115,248 A | * | 5/1992 | Roederer | 342/368 |
| 5,724,044 A | * | 3/1998 | Tanaka | 342/371 |
| 5,734,349 A | * | 3/1998 | Lenormand et al. | 342/371 |
| 6,452,988 B1 | | 9/2002 | Hayward | 375/346 |

OTHER PUBLICATIONS

Lal C. Godara, Applications of Antenna Arrays to Mobile Communications, Part I: Performance Improvement, Feasibility, and System Considerations, Proc. Of the IEEE, vol. 85, No. 7, pp. 1031–1060 (Jul. 1997).

John L. Brown, Jr. and Richard O. Rowlands, Design of Directional Arrays, Journal of the Acoustical Society of America, vol. 31, No. 12, pp. 1638–1643 (Dec. 1959).

* cited by examiner

*Primary Examiner*—Ian J. Lobo
(74) *Attorney, Agent, or Firm*—Ropes & Gray LLP

(57) ABSTRACT

A system and method to provide maximum power over large angular sectors using an array of transducers is disclosed. Array segments of transducers and phase shifters form a beam from each of the array segments, wherein the set of beams overlap to form a large sector coverage beam. The phase of each of the signals fed to the radiating elements is shifted, such that the difference between beam point directions of the beams of two adjacent array segments is substantially equal to one half of the sum of the beamwidths of the beams of the two adjacent array segments. The phase of each of the signals fed to the radiating elements may also be shifted in proportion to the square of the distance between one end of the array of transducers and the position of each of the plurality of radiating elements.

15 Claims, 4 Drawing Sheets

BEAM BROADENING WITH MAXIMUM POWER IN ARRAY TRANSDUCERS

FIELD OF THE INVENTION

The invention relates in general to sound and electromagnetic transmission systems and methods, and in particular to array transducers in which the transmit or receive beamwidth is broadened while maintaining or maximizing transmit power or receive sensitivity.

BACKGROUND OF THE INVENTION

In electromagnetic or sound transmission systems, an array transducer uses an array of simple transducers. Each transducer forming the array is known as an element of the array. The signals emitted from the elements are linearly combined as a weighted sum to form a receive array. A common signal is fed to the elements and weighted to form a transmit array. The process of combining the signals emitted from or fed to different elements is known as beam forming. When signals are combined without any gain and phase change, the direction in which the array has maximum response is perpendicular to the line joining all elements of a straight linear array.

The signals from or the common signal fed to each element of the array may be weighted in amplitude and phase. Phasing, or time delaying, points the maximum response of the array, or the beam center, in a desired direction. The amplitude weights affect the total signal gain of the array, the width of the main beam, and the level of the array response in directions outside the main beam (that is, side lobe levels). For frequency independent amplitude weights and for phasing which time delays all elements to add up in phase in response to an incident plane wave in a particular direction, the beamwidth of an array transducer decreases with increasing frequency. For wide area search purposes, it is often desirable to transmit acoustic power over a large angular sector with uniform coverage over the sector independent of the frequency. Thus various frequency dependent element weighting methods have been sought to counteract the natural tendency of the array beams to get narrower with increasing frequency.

One such method is to invoke linear superposition and simultaneously form a fan of contiguous narrow beams that together cover the desired broad angular sector. The number of beams must increase and the angular interval between steering directions of adjacent beams must decrease with increasing frequency in order to maintain relatively uniform sector coverage. When the implications of this approach on element amplitude weights are analyzed, it is found that the element amplitude weights are reduced appreciably and vary in sign outside of a central core region on the array and that this central core region decreases in extent with increasing frequency. Thus, simultaneous steering of the full array to many overlapped steering directions, in order to maintain frequency-independent angular sector coverage, is equivalent to shortening the effective aperture of the array with increasing frequency. Since not all the available elements are being driven to maximum or even appreciable amplitude, the power output of the array is reduced and this reduction becomes more severe with increasing frequency.

Accordingly, a need in the art exists for systems and methods for weighting the elements of an array transducer in order to maintain constant beamwidth over a large frequency range while transmitting maximum power.

Accordingly, the invention provides a system and method for transmitting maximum power over large angular sectors independent of frequency. The invention also provides a system and method for receiving incoming plane wave signals with constant signal gain over large angular sectors independent of frequency.

SUMMARY OF THE INVENTION

In accordance with the invention, as embodied and broadly described herein, the invention comprises a plurality of array segments, each of the array segments having a plurality of radiating elements, and a plurality of phase shifters to shift the phase of each of the signals fed to the plurality of radiating elements, wherein an output signal from each of the plurality of array segments forms a beam. The amplitude weights on all elements within the entire transducer array are substantially uniform.

In an embodiment of the present invention, the amplitude weighting on all elements in the transducer array is uniform and the phase of each of the signals fed to the plurality of radiating elements is shifted, such that the difference between beam point directions of the beams of two adjacent array segments is substantially equal to one half of the sum of beamwidths of the beams of the two adjacent array segments.

An embodiment of the present invention operates to shift the phase of each of the signals fed to the plurality of radiating elements in proportion to the square of the distance between one end of a linear array transducer and each of the plurality of radiating elements.

Additional features and advantages of the invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers will be used throughout the drawings to refer to the same or like parts.

Figure 1:
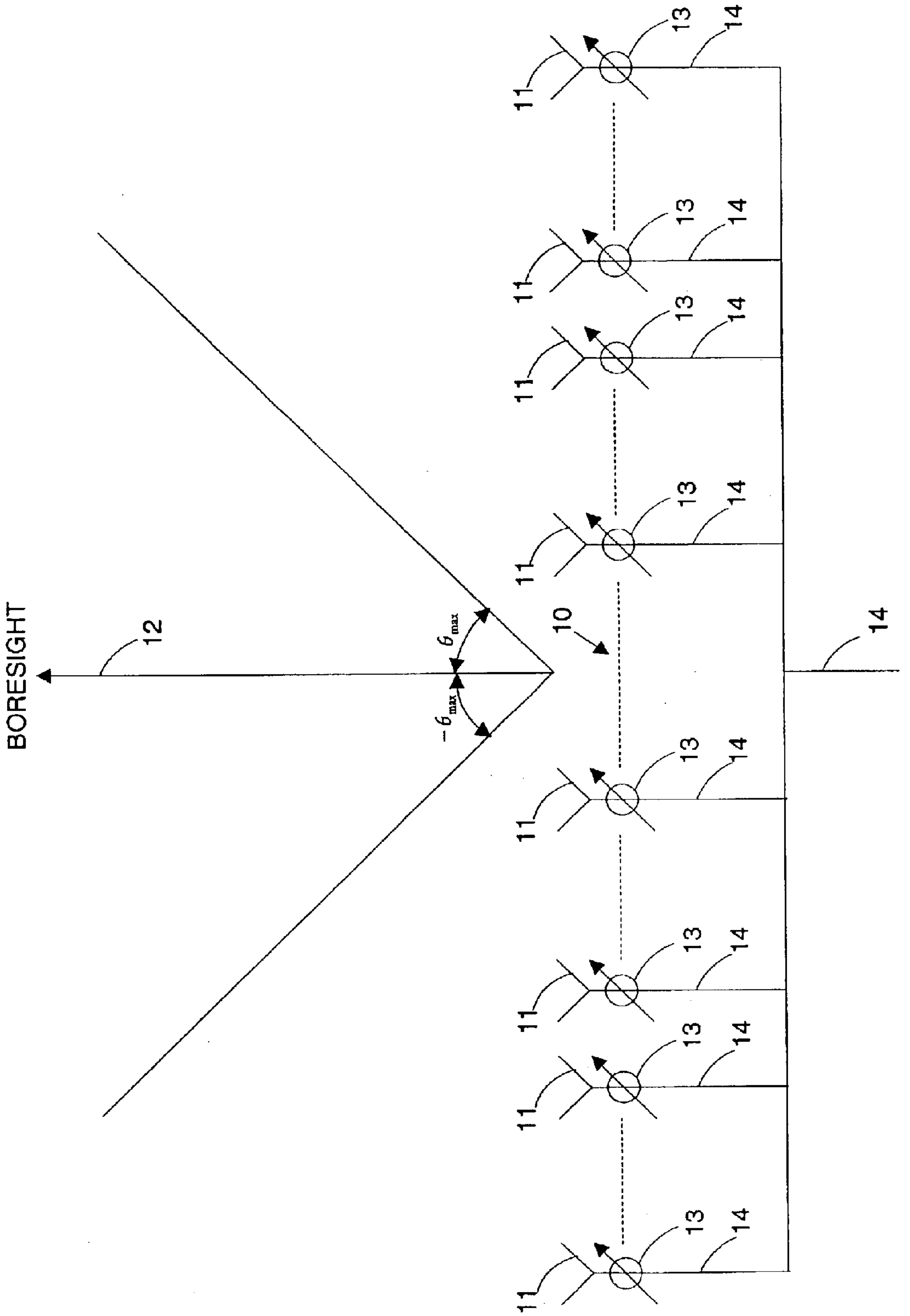
FIG. 1 is a schematic diagram showing a straight line array transducer.

In FIG. 1, an array transducer 10 includes a plurality of radiating elements 11. Signals 14 are fed to the plurality of radiating elements 11 through phase shifters 13. The common input signal 14 can be a voltage that drives radiating elements 11. The radiating element 11 can be an electro-mechanical device that converts, for example, electric power to sound power.

Each of phase shifters 13 shifts the phase of the input signal 14 fed to the plurality of radiating elements 11. A phase shifter for making a directional array of radiating elements is known in the art. See for example, John L. Brown, Jr. and Richard O. Rowlands, "Design of Directional Arrays," Journal of the Acoustical Society of America, Vol. 31, No. 12, pp. 1638–1643 (December 1959); U.S. Pat. No. 6,452,988 (issued Sep. 17, 2002) entitled ADAPTIVE SENSOR ARRAY APPARATUS; and U.S. Pat. No. 5,028,930 (issued Jul. 2, 1991) entitled COUPLING MATRIX FOR A CIRCULAR ARRAY MICROWAVE ANTENNA, the contents of both of which are hereby incorporated herein by reference.

According to an embodiment of the present invention, the array transducer 10 is a straight line array transducer and the plurality of radiating elements 11 are equispaced along the straight line array transducer 10.

In FIG. 1, the desired sector coverage $2{\cdot}\theta_{MAX}$, wherein $\theta_{MAX}$ is angle off boresight 12 of the array, is illustrated. Typically, $2{\cdot}\theta_{MAX}$ is less than 180°. The desired sector coverage $2{\cdot}\theta_{MAX}$ is determined by other system considerations beyond the scope of this invention. In terms of trace wavenumber along the straight line array transducer, the desired sector coverage is $+/-k_{MAX}$ off the boresight 12, wherein $k_{MAX}$ can be determined using the following formula:

$$k_{MAX}=k_o{\cdot}\sin(\theta_{MAX}) \quad (1)$$

wherein $k_0 \equiv 2\pi/\gamma_0$ represents the acoustic wavenumber. Here, $\lambda_0 \equiv c_0/f$ represents acoustic wavelength, i.e., the wavelength of a freely propagating acoustic wave in the medium of interest (e.g., water), wherein $c_0$ is the speed of sound and $f$ is the frequency of the wave in Hertz.

Figure 2:
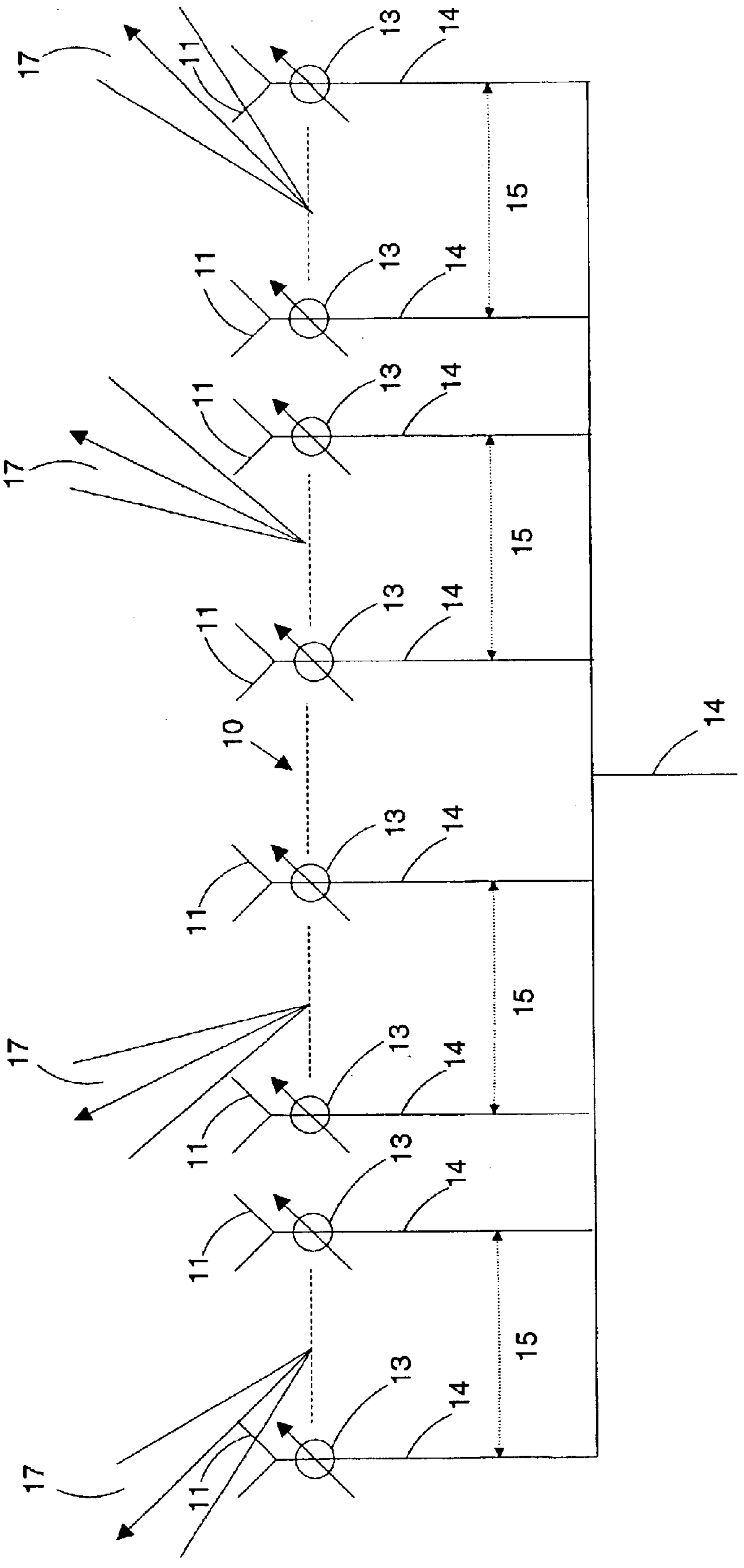
FIG. 2 is a schematic diagram showing an embodiment of a straight line array transducer.

In the embodiment shown in FIG. 2, a straight line array transducer 10 is divided into a plurality of array segments 15. Preferably, each of the array segments 15 has the same length, and also includes one or more radiating elements 11. Common input signal 14 is fed to the plurality of radiating elements through phase shifters 13. Amplitudes and phases of each of the signals 14 are substantially equal. The signal 14 can be a voltage that drives radiating elements 11. The radiating element 11 can be an electro-mechanical device that converts, for example, electric power to sound or electromagnetic power.

Each of the phase shifters 13 shifts the phase of each signal 14 fed to the plurality of radiating elements 11 such that each segment forms a separate beam 17. Preferably, the gain of each of the signals 14 is kept substantially the same. Although each segment forms a separate beam 17, at operational distances, the beams overlap and appear to emanate from a single source.

Figure 3:
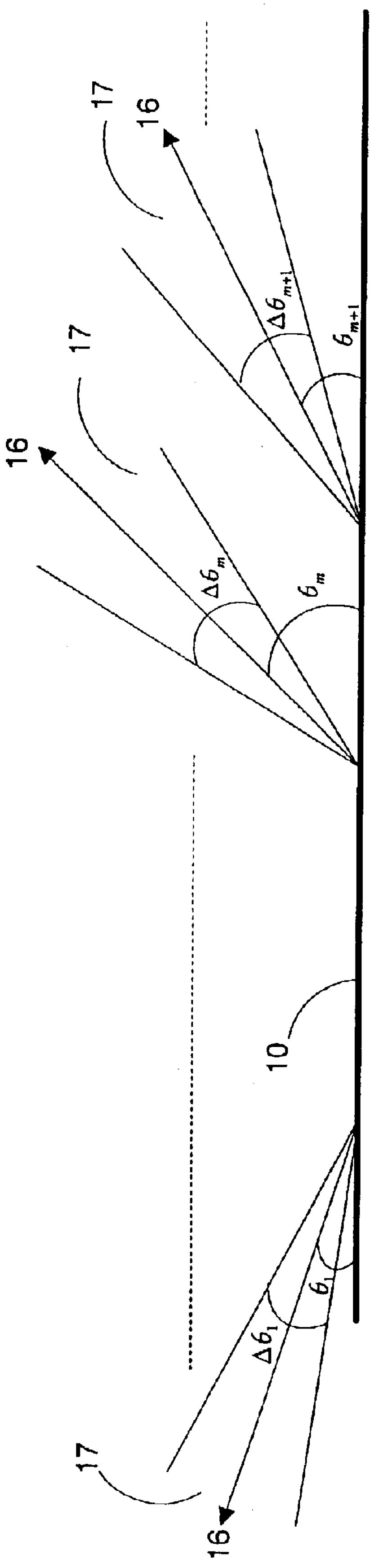
FIG. 3 is a schematic diagram showing the relationship between beam point directions of the beams of two adjacent array segments and beamwidths of the beams of said two adjacent array segments.

In the embodiment shown in FIG. 3, In order to achieve uniform coverage over the entire desired angular sector, the phase of each of the signals fed to the plurality of radiating elements is shifted such that the difference between the beam point directions 16 of the beams of two adjacent array segments, $\theta_m-\theta_{m+1}$, is substantially equal to one half of the sum of half-power beamwidths of the beams of the two adjacent array segments, $\Delta\theta_m$ and $\Delta\theta_{m+1}$. The half-power beamwidth is the width of the beam between the two half-power points. The number of array segments, N, equals the number of beams 17, and can be obtained from the following formula.

$$N=\sqrt{\frac{D\cdot\sin(\theta_{MAX})}{\gamma}} \quad (2)$$

wherein $D \equiv 2{\cdot}L/\lambda_0$ represents the directivity factor, wherein $\lambda_0$ represents the acoustic wavelength, for example, in meters, and L represents the length of the straight line array transducer, in the same units as $\lambda_0$;

$\theta_{MAX}$ represents half of the desired angular sector coverage in radians; and $\gamma$ represents an overlap parameter. The overlap parameter, $\gamma$, is a measure of the density of beam spacing in wavenumber relative to $2\pi/l$. According to one embodiment of the present invention, $\gamma$ is substantially equal to 0.886 for half-power points. The expression for the directivity factor, D, is twice the ratio of the length of the straight line array transducer, L, to acoustic wavelength, $\lambda_0$. Since both L and $\lambda_0$ are length measures, D is a dimensionless number that does not have a unit and any unit can be used for L and $\lambda_0$ as long as the units for both L and $\lambda_0$ are the same.

According to an embodiment of the present invention, two adjacent array segments are in-phase for sound incident in the beam crossover direction. Moreover, the difference between the beam center of the $n^{th}$ array segment and the beam center of the $(n+1)^{th}$ array segment is substantially equal to $(n+½)\ k_l$, wherein $k_l$ is the effective beamwidth in wavenumber (for example, the half-power beamwidth) of each of the array segments 15. Furthermore, the effective beamwidth of each of the array segments 15 is kept the same by using equal length array segments to form each beam. Applying the above methods to an array of discrete segments steered in discrete directions to an array with continuously varying phase to each element, the phase of each of the signals fed to the plurality of radiating elements 11 along the straight line array transducer 10 is shifted based on the following formula:

$$\Phi_s=\frac{1}{2}\cdot\frac{x^2}{l}\cdot k_l \quad (3)$$

wherein $\phi$, represents the phase shift in radians;

X represents the distance between one end of the straight line array transducer 10 and each of the plurality of radiating elements 11, for example, in meters;

l, which equals L/N, represents the length of each of the array segments 15, for example, in meters, wherein L represents the length of the straight line array transducer 10, for example, in meters, and N represents the number of the array segments 15; and $k_l$ represents the effective beamwidth (for example, the half-power beamwidth) of each of the array segments 15 in terms of wavenumber. Since both X and l are length measures and $k_l$ is the inverse of an length measure, $\phi$, is a number that does not have a unit and any length unit can be used for X, l, and $k_l$ as long as the length units for X, l, and $1/k_l$ are the same. Note that the distance X can be measured from either end as long as all the distances are measured from the same end.

Moreover, the effective beamwidth in terms of wavenumber, $k_l$, of any nearly linear phase segment of the full array is obtained based on the following formula:

$$k_t = \gamma \cdot \frac{2\pi}{l} \quad (4)$$

wherein γ represents an overlap parameter. γ is a measure of the density of beam spacing in wavenumber relative to 2π/l. According to one embodiment of the present invention, γ is substantially equal to 0.886 for half-power points.

With $k_l = 2 \cdot k_{MAX}/N$ and $l = L/N$, the phase shift, ϕ, can also be obtained based on the following formula:

$$\Phi_s = \frac{x^2}{L} \cdot k_{MAX} \quad (5)$$

wherein ϕ, represents the phase shift in radians;

X represents the distance between one end of the straight line array transducer 10 and each of the plurality of radiating elements 11, for example, in meters;

L represents the length of the straight line array transducer, for example, in meters; and $k_{MAX}$, which is equal to $k_0 \cdot \sin(6_{MAX})$, represents the desired sector coverage in trace wavenumber, wherein $2 \cdot 6_{MAX}$ represents the desired angular sector coverage and $k_0$ represents the acoustic wavenumber. Since both X and L are length measures and $k_{MAX}$ is the inverse of an length measure, ϕ, is a number that does not have a unit and any unit can be used for X, L, and $k_{MAX}$ as long as the units for X, L, and $1/k_{MAX}$ are the same.

Note that formulas (3) and (5) are originally for a continuous array which has continuous sensitivity or source strength per unit length. But a discrete array, comprising a plurality of discrete radiating elements, with sufficiently densely spaced elements is equivalent to a continuous array for sufficiently low frequency, i.e., for wavelengths substantially similar to or greater than the inter-element spacing.

Figure 4:
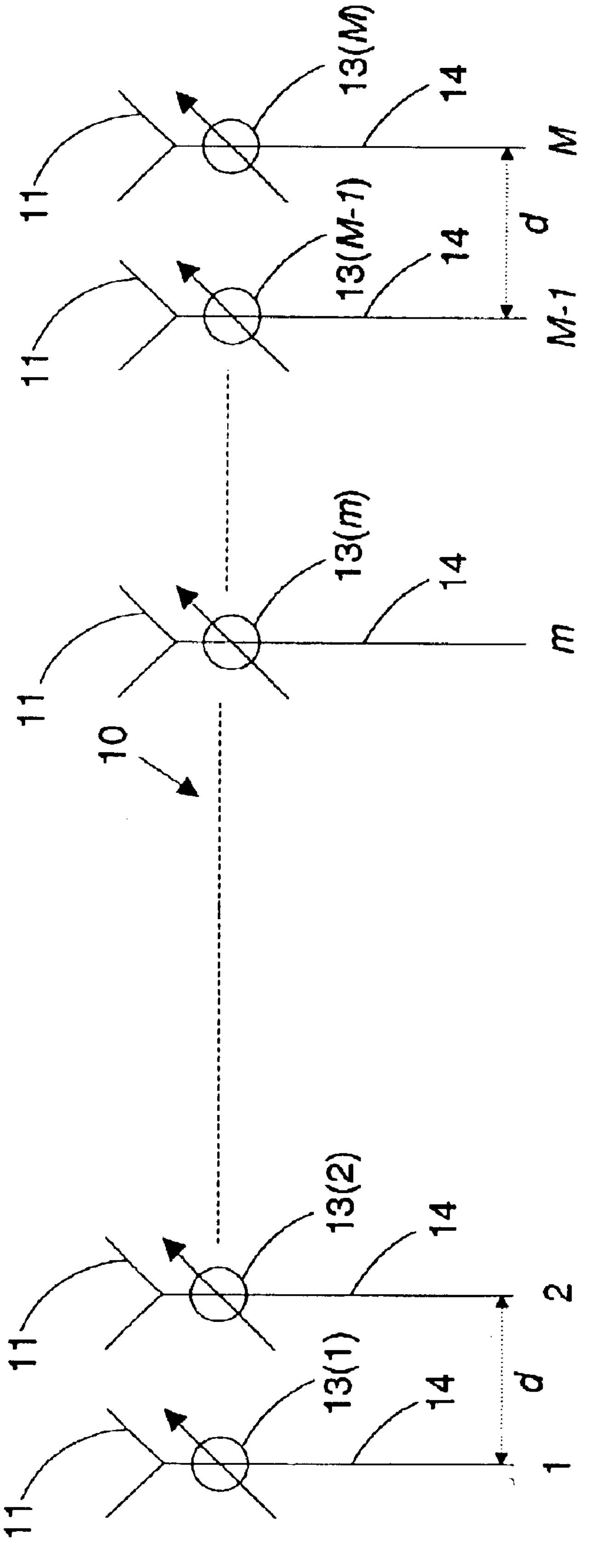
FIG. 4 is a schematic diagram showing another embodiment of a straight line array transducer having a number M discrete elements.

In another embodiment shown in FIG. 4, a straight line array transducer 10 has a set of M radiating elements 11, numbered 1 to M along the linear array, M being an integer greater than 1. Preferably, the radiating elements 11 are substantially equispaced along the straight line array transducer 10, with uniform spacing d.

Each of phase shifters 13(1)–13(M) applies beam forming weighting, $w_m$, to the signal fed to the m-th radiating element, m being a number between 1 and M. A weighting means for applying beam forming weighting to a signal fed to a radiating element is known in the art. See, for example, John L. Brown, Jr. and Richard O. Rowlands, "Design of Directional Arrays," Journal of the Acoustical Society of America, Vol. 31, No. 12, pp. 1638–1643 (December 1959); U.S. Pat. No. 6,452,988 (issued Sep. 17, 2002) entitled ADAPTIVE SENSOR ARRAY APPARATUS; and U.S. Pat. No. 5,028,930 (issued Jul. 2, 1991) entitled COUPLING MATRIX FOR A CIRCULAR ARRAY MICROWAVE ANTENNA, the contents of both of which are hereby incorporated herein by reference.

In one embodiment, the beam forming weighting, $w_m$, to the signal fed to the m-th radiating element is represented by the following formulas:

$$w_m = e^{j\phi m} \quad (6)$$

and $$\varphi_m = \frac{m^2 \cdot d \cdot k_0 \cdot \sin(\theta_{MAX})}{M} \quad (7)$$

wherein e=2.718 . . . represents the mathematical exponential constant;

$j = \sqrt{-1}$ represents the unit imaginary number;

d represents the distance between the two neighboring radiating elements, for example, in meters;

$k_0$ represents the acoustic wavenumber; and $6_{MAX}$ represents half of the desired angular sector coverage in radians. Since d is a length measure and $k_0$ is the inverse of length measure, $d \cdot k_0$ is a number that does not have a unit and any length unit can be used for d and $k_0$ as long as the length units for both d and $1/k_0$ are the same.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for forming a set of beams using a straight line array transducer having a plurality of radiating elements, comprising the steps of:

dividing the array into a plurality of array segments, wherein lengths of each of the array segments are substantially equal;

providing a common input signal to each radiating element; and shifting a phase of the input signal fed to each of the radiating elements in an array segment, such that an output signal from each of the plurality of array segments forms a beam in the set of beams that overlap to form a large sector coverage beam; and wherein the difference between beam point directions of the beams of two adjacent array segments is substantially equal to one half of the sum of beamwidths of the beams of said two adjacent array segments.

2. The method of claim 1, wherein:

the number of the plurality of array segments N is obtained based on the following formulas:

$$N = \sqrt{\frac{D \cdot \sin(\theta_{MAX})}{\gamma}},$$

and $D = 2 \cdot L/\lambda_0$ wherein, $\lambda_0$ represents the acoustic wavelength;

L represents the length of the straight line array transducer; and $\theta_{MAX}$ represents half of a desired angular sector coverage in radians.

3. The method of claim 1, wherein:

the phase of each of the signals fed to the plurality of radiating elements is shifted based on the following formula:

$$\Phi_s = \frac{1}{2} \cdot \frac{x^2}{\lambda} \cdot k_\lambda$$

wherein $\phi_s$ represents the phase shift in radians;

X represents the distance between one end of the array and each of the plurality of radiating elements;

$\lambda$ represents the length of the array segment; and $k_\lambda$ represents effective beamwidth of the array segment in wavenumber.

4. The method of claim 3, wherein:

the effective beamwidth is based on the following formula:

$$k_\lambda = \gamma \cdot \frac{2\pi}{\lambda}$$

wherein $\gamma$ represents an overlap parameter.

5. The method of claim 4, wherein:

$\gamma$ is substantially equal to 0.886.

6. A method for forming a set of beams using a straight line array transducer having a plurality of radiating elements, comprising the steps of:

dividing the array into a plurality of array segments, wherein lengths of each of the array segments are substantially equal;

providing a common input signal to each radiating element;

shifting a phase of the input signal fed to each of the radiating elements in an array segment, such that an output signal from each of the plurality of array segments forms a beam in the set of beams that overlap to form a large sector coverage beam; and the difference between beam point directions of the beams of two adjacent array segments is substantially equal to one half of the sum of beamwidths of the beams of said two adjacent array segments and;

wherein the phase of each of the signals fed to the plurality of radiating elements is shifted in proportion to the square of the distance between one end of the array transducer and each of the plurality of radiating elements.

7. The method of claim 6, wherein:

the phase of each of the signals fed to the plurality of radiating elements is shifted based on the following formula:

$$\Phi_s = \frac{x^2}{L} \cdot k_{\mathrm{MAX}}$$

wherein $\phi_s$ represents the phase shift in radians;

X represents the distance between one end of the array transducer and each of the plurality of radiating elements;

L represents the length of the array transducer; and $k_{MAX}=k_0 \cdot \sin(\theta_{MAX})$, represents one half of a desired angular sector coverage in trace wavenumber, wherein $\theta_{MAX}$ represents one half of the desired angular sector coverage in radian, and $k_0$ represents the acoustic wavenumber.

8. A method for forming a beam of a straight line array transducer having a set of M radiating elements, numbered 1 to M disposed along the straight line array transducer and with a uniform spacing d, M, being an integer greater than 1, said method comprising the steps of:

providing an input signal to each radiating element;

applying beam forming weighting $w_m$ to the signal fed to the m-th radiating element, m being a number between 1 and M; and combining the signals to form the beam of the straight line array transducer;

wherein the beam forming weighting $w_m$ is represented by the following formulas:

$$w_m = e^{j\phi_m}$$

and $$\varphi_m = \frac{m^2 \cdot d \cdot k_0 \cdot \sin(\theta_{\mathrm{MAX}})}{M}$$

wherein e=2.718 represents the mathematical exponential constant;

$j=\sqrt{-1}$ represents the unit imaginary number;

$\theta_{MAX}$ represents one half of a desired angular sector coverage in radians; and $k_0$ represents acoustic wavenumber.

9. A straight line array transducer, comprising:

a plurality of array segments, each of said plurality of array segments having a plurality of radiating elements, and a plurality of weighting means for shifting the phase of each signal fed to the plurality of radiating elements, wherein, an output signal from each of the plurality of array segments forms a beam and, the phase of each of the signals from the plurality of radiating elements is shifted such that the difference between beam point directions of the beams of two adjacent array segments is substantially equal to one half of the sum of beamwidths of the beams of said two adjacent array segments.

10. A straight line array transducer, comprising:

a plurality of array segments, each of said plurality of array segments having a plurality of radiating elements, and a plurality of weighting means for shifting the phase of each signal fed to the plurality of radiating elements, wherein, an output signal from each of the plurality of array segments forms a beam and, the number of the plurality of array segments N is based on the following formulas:

$$N = \sqrt{\frac{D \cdot \sin(\theta_{\mathrm{MAX}})}{\gamma}}, \text{ and}$$

wherein, $\lambda_0$ represents the acoustic wavelength;

L represents the length of the straight line array transducer; and $\theta_{MAX}$ represents half of a desired angular sector coverage in radians.

11. A straight line array transducer, comprising:

a plurality of array segments, each of said plurality of array segments having a plurality of radiating elements, and a plurality of weighting means for shifting the phase of each signal fed to the plurality of radiating elements, wherein, an output signal from each of the plurality of array segments forms a beam and, the phase of each of the signals fed to the plurality of radiating elements is shifted based on the following formula:

$$\Phi_s = \frac{1}{2} \cdot \frac{x^2}{\lambda} \cdot k_\lambda$$

wherein $\phi$, represents a phase shift in radians;

X represents the distance between one end of the array and each of the plurality of radiating elements;

$\lambda$ represents the length of the array segment; and $k_\lambda$ represents the effective beamwidth of the array segment in wavenumber.

12. The array transducer of claim 11, wherein:

the effective beamwidth is obtained based on the following formula:

$$k_\lambda = \gamma \cdot \frac{2\pi}{\lambda}$$

wherein $\gamma$ represents an overlap parameter.

13. The array transducer of claim 12, wherein:

$\gamma$ is substantially equal to 0.886.

14. A straight line array transducer, comprising:

a plurality of array segments, each of said plurality of array segments having a plurality of radiating elements, and a plurality of weighting means for shifting the phase of each signal fed to the plurality of radiating elements, wherein, an output signal from each of the plurality of array segments forms a beam and the phase of each of the signals fed to the plurality of radiating elements is shifted based on the following formula:

$$\Phi_s = \frac{x^2}{L} \cdot k_{MAX}$$

wherein $\phi$, represents a phase shift in radians;

X represents the distance between one end of the array and position of each of the plurality of radiating elements;

L represents the length of the array transducer; and $k_{MAX}=k_0 \cdot \sin(\theta_{MAX})$, represents one half of the desired angular sector coverage in trace wavenumber, wherein $\theta_{MAX}$ represents one half of the desired angular sector coverage in angle, and $k_0$ represents the acoustic wavenumber.

15. A straight line array transducer having a set of M radiating elements, numbered 1 to M along the straight line array transducer and with uniform spacing d, M being an integer greater than 1, comprising:

means for applying beam forming weighting $w_m$ to the signal fed to the m-th radiating element, m being a number between 1 and M; and means for combining the signals to form the beam of the straight line array transducer;

wherein the beam forming weighting $w_m$ is represented by the following formulas:

and $$\varphi_m = \frac{m^2 \cdot d \cdot k_0 \cdot \sin(\theta_{MAX})}{M}$$

wherein e=2.718 represents the mathematical exponential constant;

$j=\sqrt{-1}$ represents the unit imaginary number;

$\theta_{MAX}$ represents half of a desired angular sector coverage in radians, and $k_0$ represents acoustic wavenumber.

* * * * *